US007345270B1

(12) United States Patent
Jones et al.

(10) Patent No.: US 7,345,270 B1
(45) Date of Patent: Mar. 18, 2008

(54) PHOTOCONTROL WITH RADIO-CONTROLLED TIMER AND A DECODER

(76) Inventors: Richard S. Jones, 2224 Quail Hollow Ct., West Columbia, SC (US) 29169; Dale Thomas, 82 Greystone Dr., Cleveland, GA (US) 30528

( * ) Notice: Subject to any disclaimer, the term of this patent is extended or adjusted under 35 U.S.C. 154(b) by 48 days.

(21) Appl. No.: 11/498,903

(22) Filed: Aug. 3, 2006

(51) Int. Cl.
    *H01J 40/14* (2006.01)
(52) U.S. Cl. .......................... 250/214 AL; 250/214 LS
(58) Field of Classification Search ......... 250/214 AL, 250/214 R, 214.1, 214 B, 214 SG, 214 D, 250/214 LS; 315/135, 136, 120, 154; 343/721, 343/703
    See application file for complete search history.

(56) References Cited

U.S. PATENT DOCUMENTS 4,937,443 A * 6/1990 Smoot ........................ 250/221
6,814,299 B1 11/2004 Carey

OTHER PUBLICATIONS

Webpage Energy Saving Products Index—Main Index (article entitled Lightmaster II) from http://energy.tycoelectronics.com (no date indicated).
Webpage Energy Saving Control (article entitle Save 50% On Energy Costs) from http://precisionmulticontrols.com/Energy.html dated Jan. 22, 2006.

* cited by examiner

*Primary Examiner*—Que T Le
(74) *Attorney, Agent, or Firm*—Michael A. Mann; Nexsen Pruet, LLC

(57) ABSTRACT

A photocontrol controls the activation of lighting based on ambient light and the time of day using a radio-controlled timer. Radio signals from a particular source of correct time, such as the National Institute for Science and Technology's WWVB radio broadcast, carry encoded time information that can be decoded by the photocontrol to ascertain the current time on start up and periodically during operation. The correct date and time information is used to synchronize the photocontrol's internal clock so that it can turn the lighting load off or on at specific times of the day in accordance with the user's needs. Thus area, business signage, and security lighting, for example, can be turned off late at night and then back on early in the morning to reduce energy consumption by the lighting during those hours when the lighting is not needed.

15 Claims, 3 Drawing Sheets

US 7,345,270 B1

PHOTOCONTROL WITH RADIO-CONTROLLED TIMER AND A DECODER

CROSS REFERENCE TO RELATED PATENTS

Not applicable

BACKGROUND OF THE INVENTION

The present invention relates to photocontrols, which are devices for turning roadway, signage, and area lighting on and off, and more particularly, methods for synchronizing timers in photocontrols to the correct local time.

Photocontrols typically use a light level sensor to determine when it is dark enough to turn a light on and light enough to turn the light back off.

There are, however, many situations where it is desirable to turn a light off at a specific time although it may still be nighttime, as well as turn it back on at a specific time. Examples of these needs arise in connection with businesses with extended hours, parking lots, signage and security lighting.

In addition, there has been an increasing interest in saving energy and reducing light pollution. This interest has resulted in the passage of local ordinances that require lighting curfews, which are requirements that certain types of lighting be turned off at specific times.

There presently exist photocontrols that are capable of turning off lighting a fixed number of hours after dusk. For example, some photocontrols (see U.S. Pat. No. 5,895,986) can measure the duration of a night (from dusk to dawn) on a first night and then, the following night, divide that measured duration in half and thus turn the lighting off midway through the night. But neither of these methods can turn off the lighting at a specific time.

Turning off a light at a specific time requires that the photocontrol know the local time. In order to do this, the photocontrol either needs to have an internal clock or to be able to communicate with a remote clock. A photocontrol with a built-in clock has the disadvantage of requiring that the clock be manually set. If this clock setting becomes incorrect for whatever reason, it must be manually reset. Manual resetting usually requires a worker to ascend the lighting pole to reach the photocontrol, which is an expensive and time-consuming task. Furthermore, the necessity of resetting an internal clock of a photocontrol often follows power outages, a change to or from daylight savings time, or as a result of general drift within the internal clock, any of which can require many photocontrols to be reset at the same time. The internal clock may contain a battery to provide power for keeping track of time in the event of a power outage, however, batteries are vulnerable and need to be replaced periodically.

A photocontrol could communicate with a network clock. However, this solution can be very complicated and expensive as the network either needs to exist or be created.

Another existing photocontrol design measures the length of a night and then refers to a programmed table to determine which night of the year has that length. Once it identifies the particular night by its length, given the longitude and latitude of its location, it can estimate the local time. This provides a rough clock, akin to a sundial in accuracy. A principle disadvantage in this method is that a cloudy day, a limb in front of the photocontrol and other circumstances can fool the photocontrol into thinking it is the wrong day, thus rendering the clock even less accurate.

Also, should the standard dates for daylight saving time change for whatever reason, such as the passage of legislation by the applicable government, this design will not be able to adapt without reprogramming.

Thus there remains a need for a photocontrol that knows local time accurately but without the disadvantages of prior art solutions.

SUMMARY OF THE INVENTION

According to its major aspects and briefly recited, the present invention is a photocontrol that is adapted to receive radio signals from a particular source of correct time, such as an official source, namely, a source entrusted by a government with the responsibility of keeping accurate time, such as, for example, the National Institute for Science and Technology. Radio signals from this source carry encoded time information that can be decoded by the photocontrol so that it can ascertain the current time, without including a clock in the photocontrol and without accessing a remote clock via a network, and without using approximations of the time. The present photocontrol ascertains the correct time each time it starts up and periodically during its operation, using that time to synchronize its internal clock so that it can turn the lighting load off or turn on in strict compliance with the user's needs.

The radio signal transmitted by a US Government Agency, namely the National Institute for Science and Technology (NIST), from Ft Collins, Colo., and is a suitable official source. This signal, an amplitude modulated, digitally coded signal, rides a low frequency carrier wave, and is ideal for present purposes and highly accurate. Other sources are also possible, such as timing signals broadcast from satellites.

The present photocontrol has three switches, one for setting the time zone where the control will be used, a second for setting the turn-off time, and a third, optional switch for setting the turn-back-on time.

A feature of the present invention is the use of the NIST radio signal. Not only is this signal receivable from all over the United States, as it is intended to be, but it is especially easy to receive it at night when the photo controller is likely to be more active. Also, the technology is widely available for receiving and decoding this signal. Finally, it is as accurate as it needs to be for complying with user requirements and local regulatory requirements.

These and other features and their advantages will be apparent to those skilled in the art of photocontrol design from a careful reading of the Detailed Description of Preferred Embodiments accompanied by the following drawings.

DETAILED DESCRIPTION OF THE INVENTION

The present invention is a photocontrol with a radio-controlled timer. In addition to a light sensor that is used to activate an electrical load such as lighting at dusk and to deactivate it at dawn, the present photocontrol can be set to turn the lighting off at night at a particular time selected by the user and, optionally, to turn it on again at a particular time before dawn.

For example, if a business operates on extended hours, such as a convenience store does, the present photocontrol can turn on the business signage, security lighting and area lighting at dusk, turn it off when the business closes later that night, turn it back on when the business resumes operation early the next morning, and then off again at dawn. The light sensor of the photocontrol turns the light on at dusk and off at dawn based on ambient lighting, but the radio-controlled timer turns the light off at the close of the business day and on at the start of the next business day, unless the light sensor signals that the ambient light when the business is opening up is already sufficient.

The photo-control has an on-board timer that keeps track of the passage of time using the carrier frequency of the power source for a clock pulse. This timer is akin to a clock but in actuality only counts pulses; it must be told the time. Once told, it will estimate the correct time by the number of pulses it has counted since it was last given the current time. Thus, the accumulated pulses indicate the passage of time but the correspondence of the accumulated pulses to a date and time requires synchronizing the counted time with true time from the date and time information extracted from a radio signal from a source of correct date and time information. If, for example, it is known that at pulse 1234567 the date and time is Wednesday Mar. 4, 2006, at 12:00 PM, then when the number of accumulated pulses reaches 2345678, for a difference of 1,111,111 pulses, each pulse of approximately $\frac{1}{60}^{th}$ of a second in duration, the inverse of a 60 Hz alternating current power source, then the timer can determine that 1,111,111 pulses is equivalent to 5.144 hours later or Wednesday, March 4, 5:08 PM. If the decoded date and time signal shows the true or correct local time to be 5:09 PM, the correct time is substituted for the accumulated time.

Figure 1:
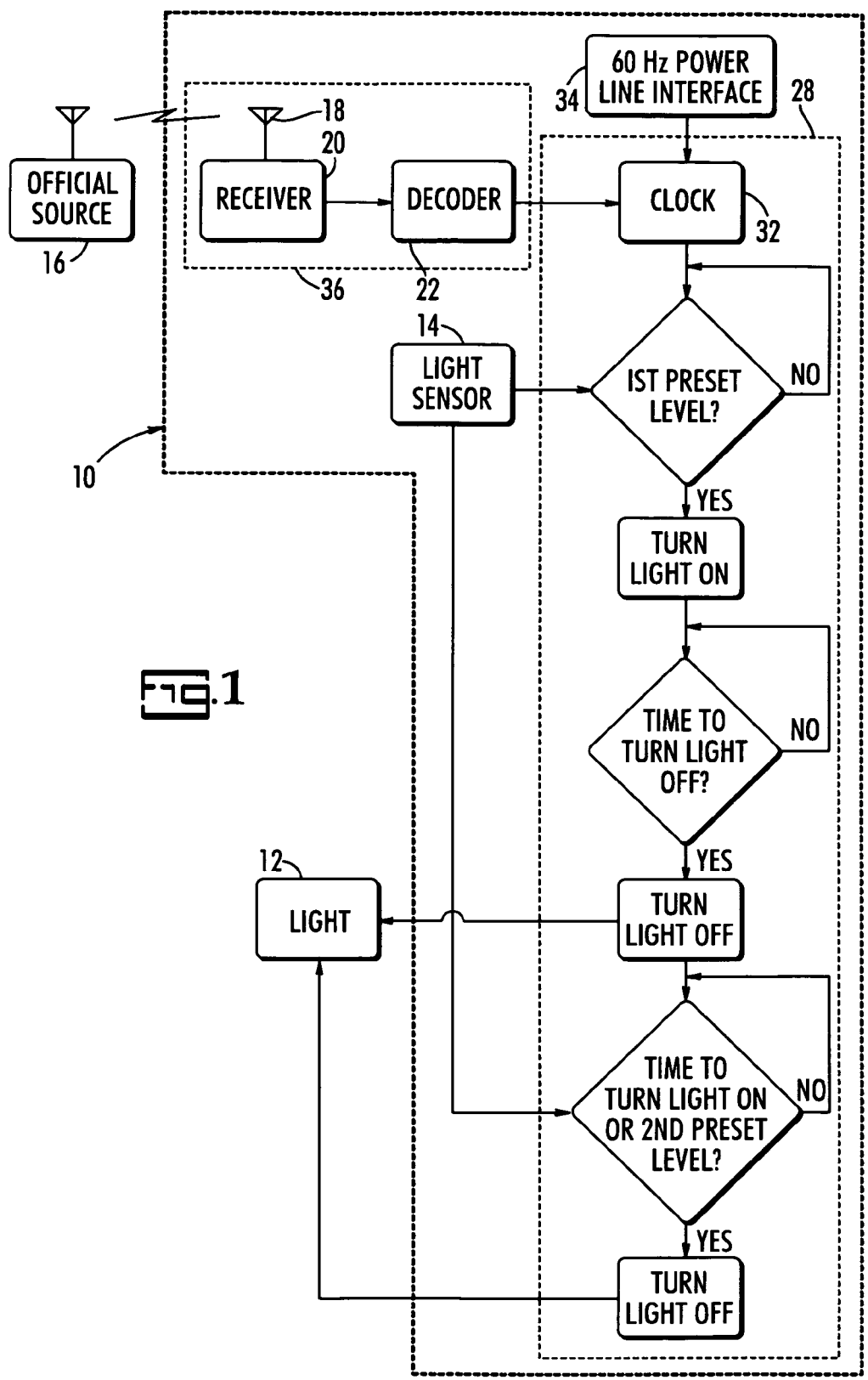
FIG. 1 is flow chart of a photocontrol with a radio-controlled clock according to a preferred embodiment of the present invention.
Figure 2:
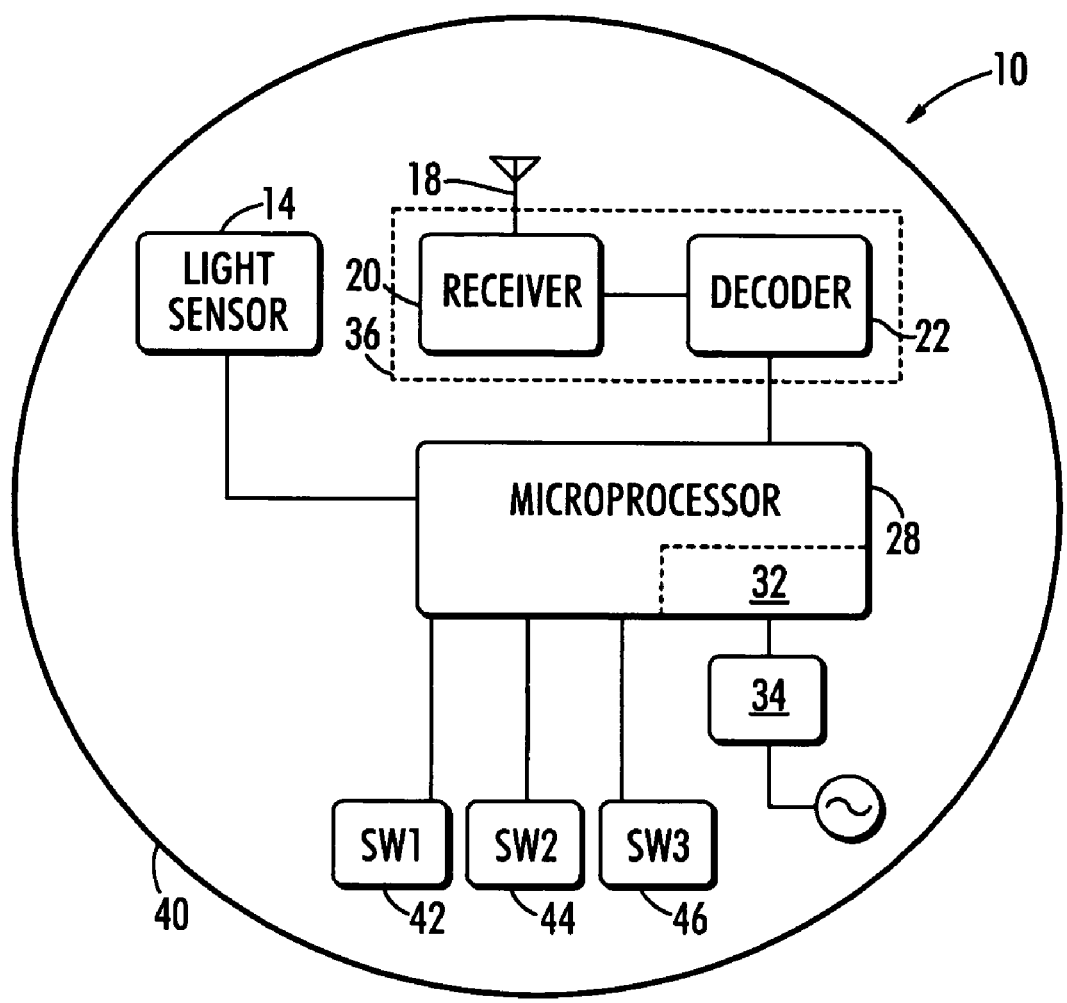
FIG. 2 is a block diagram of a photocontrol power supply according to a preferred embodiment of the present invention.

Referring now to the figures, FIG. 1 is a flow chart showing the operation of the present photocontrol, and FIG. 2 is a block diagram of the present photo control.

A photocontrol, generally indicated by reference number 10, is shown in FIGS. 1 and 2. Photocontrol 10 controls a light 12, or other load that might require activation or deactivation in connection with ambient light levels and particular times. The ambient light level in general refers to the level of light available in an area, whether that light includes natural light, manmade light or a combination of both, for humans to use to see. A first preset level can be set that requires additional light for humans to see as the ambient light level drops, such as occurs at dusk, and a second present level can be set that no longer requires additional light for humans to see as the ambient light level gets progressively higher, such as occurs at dawn. The first and second levels of light can be the same level.

When the ambient light falls below the first preset level, light 12 needs to be turned on; when the ambient light rises above the second preset level, light 12 can be turned off.

In general, the present photocontrol 10 uses a light sensor 14, such as a photo transistor, to determine the level of ambient light but allows the user to turn light 12 off even when the level of ambient light is below the first preset level and to turn light back on as long as the level of ambient light is below the second present level. This allows the light to be on during low light level times except for a period during the late night and early morning when it can be off, essentially a "notch" of time during the night when light 12 is deactivated to save energy and reduce light pollution. In order for photocontrol 10 to know the time to turn light 12 off and then back on, it must know the time. It learns the correct time and keeps the correct time by obtaining the correct time from an official source 16.

Official source 16 is a source of a radio signal carrying in code the correct time. Source 16 is preferably an official source such as one set up by a government to keep track of official time. One such source is provided by the National Institute of Science and Technology or NIST.

NIST, located in Ft Collins, Colo., operates a radio station identified as WWVB that transmits from Boulder, Colo., a signal containing information giving the current time, date, year, daylight saving time status, leap year status, etc. The present photocontrol 10 preferably includes an antenna 18 and a radio receiver 20 responsive to antenna 18, both tuned to receiving the radio signal from official source 14. Once received, the official date and time information is extracted by a decoder 22.

Photocontrol 10 includes a microprocessor 28 that includes an internal clock 32 that keeps track of the time using clock pulses set to the reciprocal of the 60 Hz alternating current (AC) power line carrier frequency. That reciprocal is a pulse every one sixtieth of a second and is very steady. The clock pulse is extracted from the power line power after the alternating voltage signal has been dropped through a pair of 180 ohm resistors before it is fed to microprocessor 28. Microprocessor 28 then uses internal clamping diodes to create a square wave having a 60 Hz pulse. The pulses are accumulated by clock 32.

When decoder 22 ascertains the current date and time information by decoding the data and time information from the carrier signal, clock 32 synchronizes its own accumulated date and time information with the correct current date and time information from decoder 22. The term synchronization means that the time stored on the internal microprocessor clock is replaced by the time extracted from the WWVB signal. The 60 Hz frequency of the power line is reasonably steady and accurate but not as accurate as the information from WWVB, which is based on technology suitable for use as a national standard for time. Furthermore, keeping track of the current time also includes taking in to consideration daylight savings time, leap year and other much more minor adjustments. Synchronization occurs: (1) on the occurrence of an event, such as when the unit is powered up, which can occur when the unit is initially installed, or, if power is lost temporarily, upon its restoration; and (2) periodically during operation, preferably every hour. Preferably, the microprocessor accumulates several timing signals when in the process of synchronizing, and compares them with each other to be certain it has correctly decoded a complete signal before substituting the decoded data and time information for the time being counted by clock 32 based on power line carrier pulses.

The National Institute of Science and Technology low frequency radio station WWVB transmits the official US time with a 1 Hz AM subcode on a 60 kHz carrier. This is the signal received by self-setting atomic time radio-controlled clocks and watches. The data rate is one bit per second, or 1 baud. The signal format is well documented and both consumer electronics companies and home experimenters have built low frequency receivers and subcode processors to extract the bits from the signal and convert them to standard date and time formats. Indeed, a receiver and decoder for this signal can be purchased as a unit 36. A suitable unit is sold under the model number CME8000 RC Receiver IC by C-MAX, which has built in high sensitivity to the WWVB signal. A 60 kHz antenna, tuned to the WWVB frequency, is also sold by C-MAX in 60 mm and 100 mm sizes. Additional information is available from the NIST website at http://tf.nist.gov/stations/wwvb.htm. This technology is well-known and widely used in other applications.

Photocontrol 10 including light sensor 12, antenna 18, receiver 20, decoder 22, microprocessor 28 and interface 34 may be carried within a housing 40 having a window or opening (not shown) proximate to light sensor 14 so that sensor 14 can sense the ambient light in the vicinity of housing 40.

In order to complete the programming of microprocessor 28, the user must identify the time zone where photocontrol 10 will be located using a first switch 42 and a first input time, namely, that at which light 12 will be turned off after it is first turned on, which is input using a second switch 44. If the user wishes, there is a second input time, namely, when light 12 is to be turned back on unless the ambient light level is above the second preset level, in which case, light 12 is left off. This second time input is input using a third switch 46. Switches 42, 44, and 46 are preferably operated using a small screw driver to turn a screw to indicate, on a dial on the back of the photocontrol, the user's selection of time zone and time. Preferably time zones include two settings each (Eastern, Central, Rocky Mountain, and Pacific), one with and one without daylight savings time.

If the ambient light detected by light sensor 14 is below the first preset level, light 12 is activated. Once light 12 is activated, the current date and time information plus accumulated time will be compared to the first input time. When the current time plus accumulated time matches the first input time, light 12 is turned off.

As an optional feature, light 12 will remain off until current time plus accumulated time matches second input time, if any. When it does, light 12 will be turned on unless the ambient light matches the second present light level. If they match, light 12 remains off.

Figure 3:
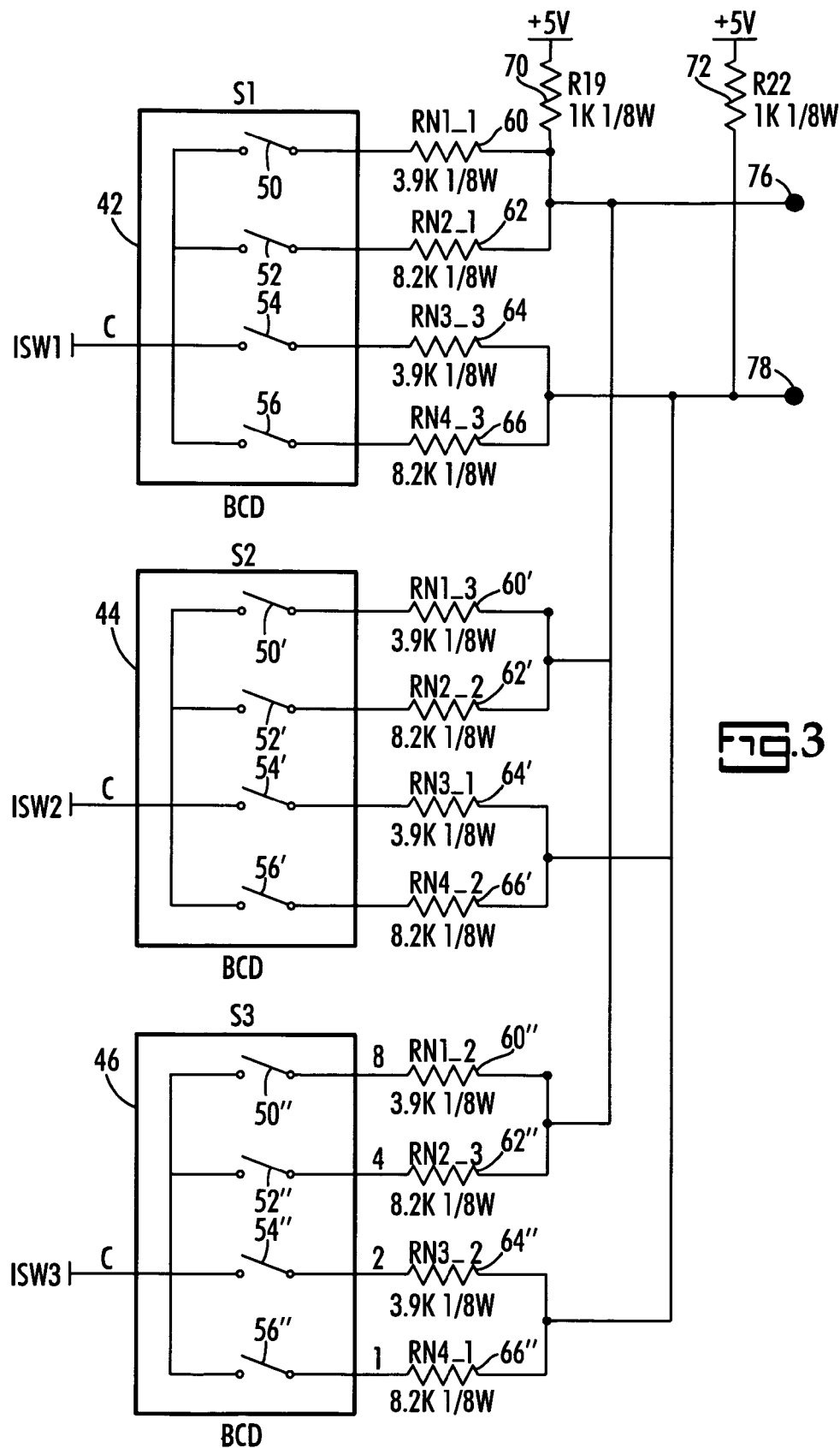
FIG. 3 is a detailed part of an electrical diagram showing the switching arrangement for inputting time zone, time-off and time-back-on for the lighting controlled by the present photocontrol, according to a preferred embodiment of the present invention.

FIG. 3 illustrates an electrical diagram of the switching arrangement. Three switches 42, 44, 46 form three sets of four switches 50, 52, 54, 56; 50', 52', 54', 56'; 50", 52", 54" and 56". Combinations of the four switches are sufficient for the various times and time zones required. The output of each switch of each set 42, 44, 46, is connected to a resister 60, 62, 64, 66, 60', 62', 64', 66', 60", 62", 64", 66", that are each part of a voltage divider network with resisters 70, 72, and that allows microprocessor 28 to identify by the voltage the particular combination that was selected by the user by using just two outputs 76, 78, and the voltage combinations they yield.

It is intended that the scope of the present invention include all modifications that incorporate its principal design features, and that the scope and limitations of the present invention are to be determined by the scope of the appended claims and their equivalents. It also should be understood, therefore, that the inventive concepts herein described are interchangeable and/or they can be used together in still other permutations of the present invention, and that other modifications and substitutions will be apparent to those skilled in the art from the foregoing description of the preferred embodiments without departing from the spirit or scope of the present invention.

What is claimed is:

1. A photocontrol, comprising:
   a housing;
   a light sensor carried by said housing, said light sensor sensing an ambient light level outside said housing and emitting a signal indicative of said ambient light level;
   a microprocessor carried by said housing and in operative connection with said light sensor so that said microprocessor receives said signal indicative of said ambient light level sensed by said light sensor, said microprocessor emitting a first output signal when said ambient light level reaches a first preprogrammed level and a second output signal when said ambient light level reaches a second preprogrammed level;
   an antenna carried by said housing;
   a radio receiver carried by said housing and responsive to said antenna, said radio receiver for receiving a radio signal from a source via said antenna, said radio signal carrying coded current date and time information;
   a decoder carried by said housing and in operative connection with said radio receiver, said decoder for extracting said coded current date and time information from said radio signal, said decoder sending current date and time information to said microprocessor when said decoder extracts data and time information from a radio signal; and
   a first switch, carried by said housing and in operational connection with said microprocessor, for inputting a time at which said microprocessor is to emit said second output signal regardless of said ambient light level.

2. The photocontrol as recited in claim 1, wherein said source is an official source of date and time information, and said receiver is tuned to said official source.

3. The photocontrol as recited in claim 1, wherein said source is a satellite beaming current date and time information, and said radio receiver is tuned to said satellite.

4. The photocontrol as recited in claim 1, further comprising a second switch, carried by said housing and in operational connection with said microprocessor, for inputting a time zone corresponding to the location of said housing.

5. The photocontrol as recited in claim 1, further comprising a third switch, carried by said housing and in operational connection with said microprocessor, for inputting a time at which said microprocessor is to emit said first output signal regardless of said ambient light level.

6. The photocontrol as recited in claim 1, wherein said microprocessor is connected to a source of an alternating electrical voltage having a frequency, and wherein said microprocessor uses the reciprocal of said frequency of said alternating electrical voltage as a clock pulse duration.

7. The photocontrol as recited in claim 1, wherein said first and said second predetermined levels are equal.

8. A photocontrol, comprising:
   a housing;
   a light sensor carried by said housing, said light sensor sensing an ambient light level outside said housing and emitting a signal indicative of said ambient light level;
   a microprocessor carried by said housing and in operative connection with said light sensor so that said microprocessor receives said signal indicative of said ambient light level sensed by said light sensor, said microprocessor emitting a first output signal when said ambient light level reaches a first preprogrammed level and a second output signal when said ambient light level reaches a second preprogrammed level;

an antenna carried by said housing tuned to a source transmitting coded current date and time information;

a radio receiver carried by said housing and responsive to said antenna, said radio receiver tuned to receive a radio signal from said source via said antenna;

a decoder carried by said housing and in operative connection with said radio receiver, said decoder for extracting said coded current date and time information from said radio signal, said decoder sending current date and time information to said microprocessor when said decoder extracts date and time information from said radio signal;

a first switch, carried by said housing and in operational connection with said microprocessor, for inputting a time at which said microprocessor is to emit said second output signal regardless of said ambient light level; and a second switch, carried by said housing and in operational connection with said microprocessor, for selecting a time zone so that said microprocessor can adjust said current date and time information for said selected time zone.

9. The photocontrol as recited in claim 8, further comprising a third switch, carried by said housing and in operational connection with said microprocessor, for inputting a time at which said microprocessor is to emit said first output signal regardless of said ambient light level.

10. The photocontrol as recited in claim 8, wherein said microprocessor is connected to a source of an alternating electrical voltage having a frequency, and wherein said microprocessor uses the reciprocal of said frequency of said alternating electrical voltage as a clock pulse.

11. The photocontrol as recited in claim 8, wherein said first and said second predetermined levels are equal.

12. A photocontrol, comprising:

a housing;

a light sensor carried by said housing, said light sensor sensing an ambient light level outside said housing and emitting a signal indicative of said ambient light level;

a microprocessor carried by said housing and in operative connection with said light sensor so that said microprocessor receives said signal indicative of said ambient light level sensed by said light sensor, said microprocessor emitting a first output signal when said ambient light level reaches a first preprogrammed level and a second output signal when said ambient light level reaches a second preprogrammed level, said microprocessor having a clock and a clock input, said clock marking the passage of time;

a power supply producing an output that includes an alternating voltage having a frequency, said clock using the inverse of said frequency of said alternating voltage for a clock pulse, said microprocessor marking the passage of time by counting clock pulses to determine the processor date and time;

an antenna carried by said housing;

a radio receiver carried by said housing and responsive to said antenna, said radio receiver for receiving a radio signal from a source via said antenna, said radio signal carrying coded current date and time information;

a decoder carried by said housing and in operative connection with said radio receiver, said decoder for extracting said coded current date and time information from said radio signal, said decoder sending current date and time information to said microprocessor, said microprocessor replacing said processor date and time with said current date and time information; and a first switch, carried by said housing and in operational connection with said microprocessor, for inputting a time at which said microprocessor is to emit said second output signal regardless of said ambient light level.

13. The photocontrol as recited in claim 12, wherein said antenna and said receiver are tuned to said source.

14. The photocontrol as recited in claim 12, further comprising a second switch, carried by said housing and in operational connection with said microprocessor, for inputting a time zone corresponding to the location of said housing.

15. The photocontrol as recited in claim 12, further comprising a third switch, carried by said housing and in operational connection with said microprocessor, for inputting a time at which said microprocessor is to emit said first output signal regardless of said ambient light level.

* * * * *